United States Patent

Duncan et al.

[15] 3,706,943
[45] Dec. 19, 1972

[54] MODULATING CIRCUIT
[72] Inventors: Vernon R. Duncan, Erlanger, Ky.; Louis L. Owen, West Chester, Ohio
[73] Assignee: General Electric Company
[22] Filed: Oct. 20, 1971
[21] Appl. No.: 190,748

[52] U.S. Cl. .................. 332/9 T, 307/265, 328/58, 332/10
[51] Int. Cl. ............................................. H03k 7/10
[58] Field of Search ............ 332/1, 9, 9 T, 10, 17, 21; 307/265; 328/58; 325/142; 179/15 AW

[56] References Cited

UNITED STATES PATENTS

| | | |
|---|---|---|
| 2,952,812 | 9/1960 | Klein et al. ............................. 332/9 R |
| 3,181,074 | 4/1965 | Cotterill ............................. 332/17 X |
| 3,384,838 | 5/1968 | Knutrud ............................. 332/9 T |
| 3,482,113 | 12/1969 | Heesh ............................. 332/9 T UX |
| 3,562,673 | 2/1971 | Caspari ............................. 332/9 T X |

Primary Examiner—Alfred L. Brody
Attorney—Frank L. Neuhauser et al.

[57] ABSTRACT

A temperature compensated circuit for multiplying together two input voltages, displays an output signal which is both pulse height and pulse width modulated as a function of two input voltage signals of opposite polarity. The area enveloped by the output signal may be integrated to display an output voltage potential representative of the multiplication of the two input signals.

8 Claims, 4 Drawing Figures

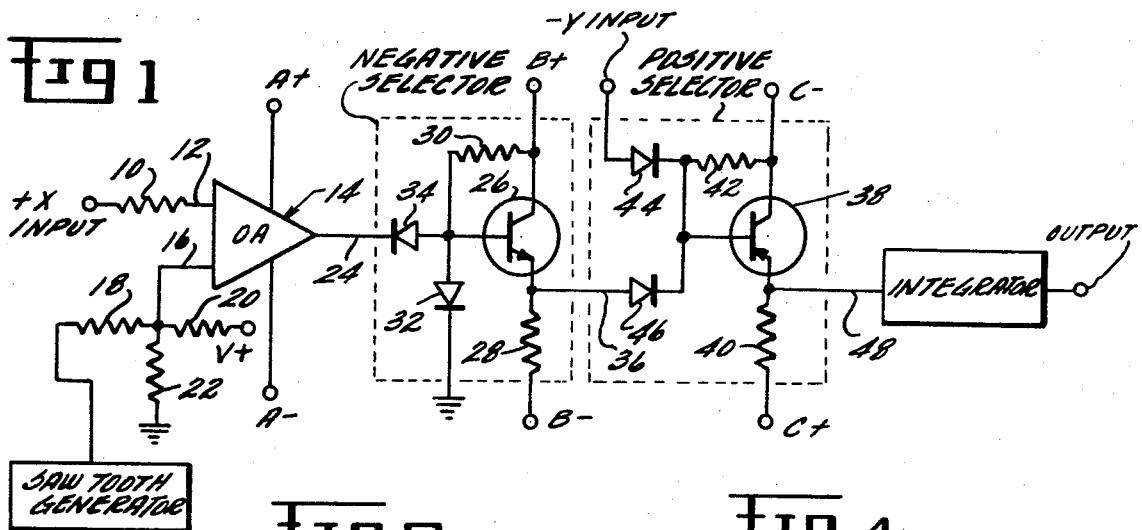
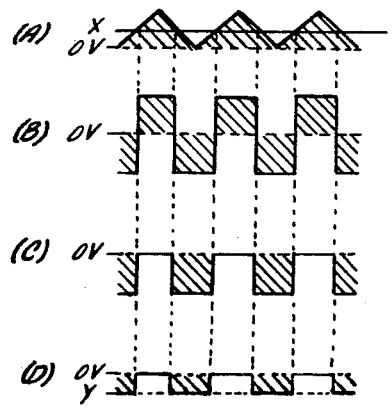
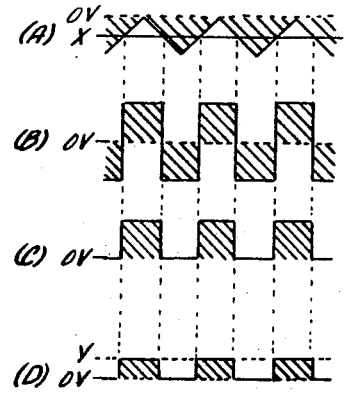
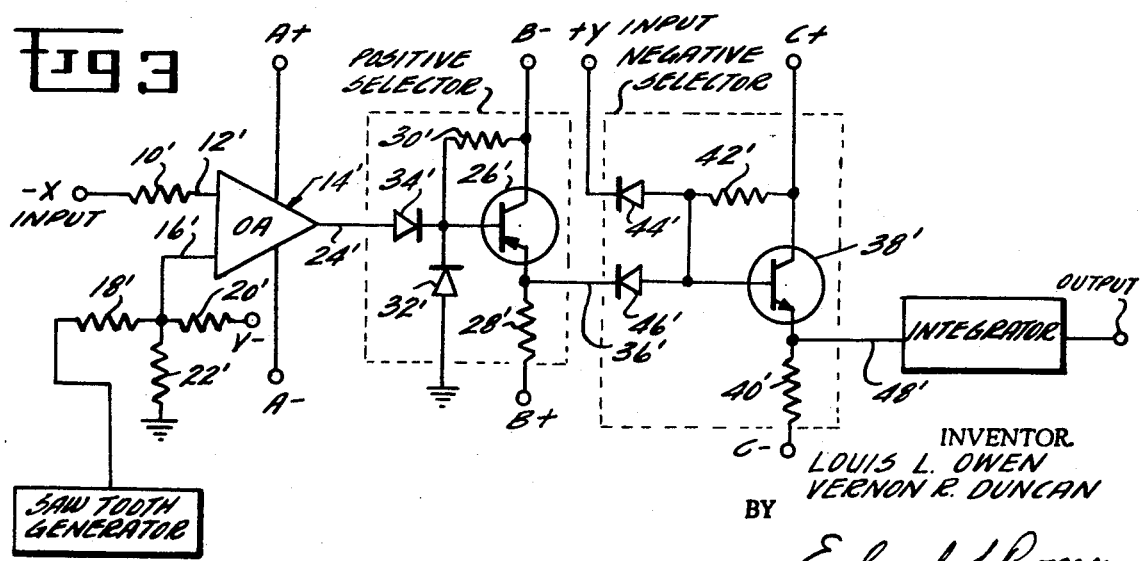

MODULATING CIRCUIT

BACKGROUND OF THE INVENTION

In general, this invention relates to a pulse height and pulse width modulating circuit and more particularly to a temperature compensated circuit for modulating pulse width as a function of a first input analog voltage and pulse height as a function of a second input analog voltage of opposite polarity from the first input. The area enveloped by the output signal from the circuit may be integrated to display an output analog voltage potential representative of the multiplication of the two input signals.

Multiplier circuits have been commonly used in the past to display an output analog voltage representative of the multiplication of two input analog voltages. Such circuits have been utilized in conjunction with gas turbine engines where they may be used for a variety of applications. For example in gas turbine engines having afterburners, multiplier circuits are used to schedule fuel flow to the afterburner as a function of the engine inlet temperature multiplied by a function of the nozzle area.

For such applications the multiplier circuits are often mounted in close proximity to the gas turbine engine hardware where the circuits must be able to operate under severe environmental stresses. The circuits must be simply constructed with a minimum of components in order to reduce the likelihood of a component or lead failure due to engine or aircraft vibration. Also, such circuits must perform with substantially no drift over a wide temperature range which may vary as much as from −60°F. to 250°F.

Therefore, it is an object of this invention to provide a pulse height and pulse width modulating circuit within a multiplier circuit for use in conjunction with a gas turbine engine wherein the entire circuit is of a highly simplified construction utilizing a minimum of components so as to substantially reduce risk of failure.

It is also an object of this invention to provide a pulse height and pulse width modulating circuit within a multiplier circuit for use in conjunction with a gas turbine engine wherein the circuits are temperature compensated for a minimum drift over a wide variation in ambient temperature.

SUMMARY OF THE INVENTION

The present invention provides a circuit for modulating pulse width as a function of a first input voltage and pulse height as a function of a second input voltage of opposite polarity. The circuit includes an operational amplifier for receiving two signals and comparing the voltage magnitudes of the signals. The first input voltage is applied to one input lead of the operational amplifier and a triangle voltage signal is applied to the other input lead of the amplifier. The operational amplifier compares the voltage magnitudes of the first input signal and the triangle voltage signal and produces either a positive output voltage signal or a negative output voltage signal depending upon which input voltage magnitude exceeds the other so as to display a square wave output signal. A first selector means is further included for passing only that polarity of the amplifier output square wave where increased pulse width of the signal is a direct consequence of increased first input voltage magnitude. A second selector means is provided for modulating the magnitude of the signal pulses passed by the first selector means as a function of the magnitude of the second input voltage. Means for providing external bias voltage to the first and second selector means are also provided.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 shows a schematic view of a multiplier circuit including the pulse width and pulse height modulating circuit of this invention.

FIG. 2 (A), (B), (C), and (D) show the signal wave form at selected points in the circuit of FIG. 1.

FIG. 3 shows an alternate embodiment for the circuit of FIG. 1.

FIG. 4 (A), (B), (C) and (D) show the signal wave form at selected points in the circuit of FIG. 3.

DESCRIPTION OF THE PREFERRED EMBODIMENT

Referring to FIG. 1, there is shown an analog multiplier circuit wherein a positive DC analog voltage may be applied at x for multiplication with a negative DC analog voltage applied at y. The x input is connected by way of a current limiting resistor 10 to the input lead 12 of an operational amplifier 14 which is used as a comparator in a manner to be made obvious from the subsequent discussion. The other input lead 16 to the operational amplifier is connected to the output of a triangle or sawtooth wave generator through a current limiting resistor 18. The triangle wave form is made positive with respect to ground by applying a positive reference voltage V + across a voltage divider formed by resistors 20 and 22. The operational amplifier is biased by means of a positive supply voltage and a negative supply voltage shown at A + and A− respectively. It is preferred that the operational amplifier be of the integrated circuit type which is well known to the circuit art, although the amplifier could alternatively be made up of a number of discrete circuit components and still function satisfactorily.

The output of the amplifier at lead 24 is connected directly to the input of a negative selector which is shown enclosed within phantom lines. The negative selector includes an NPN transistor 26 wherein the collector of the transistor is biased by direct connection to a positive supply voltage, B + and the emitter of the transistor is biased to a negative supply voltage B− by connection through a resistor 28.

Base current is supplied to transistor 26 from the B + voltage supply through resistor 30 which is shown shunting the base-collector junction of the transistor 26. The base of transistor 26 is clamped by a diode 32 so as not to exceed a voltage level above ground greater than the voltage drop from anode to cathode across the junction of diode 32. For a silicon diode the anode to cathode voltage drop is approximately 0.6V. Connection from the output lead 24 of the operational amplifier is made directly to the cathode of diode 34, with the anode of diode 34 connecting directly to the base of transistor 26.

The output lead 36 of the negative selector is connected directly to the input of a positive selector which is also shown enclosed within phantom lines.

The positive selector includes a PNP transistor 38 wherein the collector of the transistor is biased by direct connection to a negative supply voltage, C−, and the emitter of the transistor is biased to a positive supply voltage C + by connection through a resistor 40. Base current to transistor 38 is supplied from the C- voltage supply through resistor 42 which is shown as shunting the base-collector junction of transistor 38. The negative Y input voltage is connected to the base of transistor 38 through a diode 44, the anode side of which is in direct connection to the Y input, and the cathode side of which is in direct connection to the base of transistor 38. Connection from the output lead 36 of the negative selector is made directly to the anode of diode 46, with the cathode of the diode connecting directly to the base of transistor 38. An output lead 48 of the positive selector connects directly to the input of an integrator circuit which in turn integrates the area enveloped by the signal from the positive selector and provides an analog output voltage representative of the multiplication of the X and Y analog inputs. The integrator circuit may be of a simplified type well known to the circuit art, such as a filter network employing resistor and capacitor elements. Although the negative and positive selectors have been described as including discrete circuit components, it is to be understood that these circuits may also be of the integrated circuit type.

In order to better understand the operation of the above described circuit, reference should now be made to FIG. 2 in conjunction with FIG. 1. FIG. 2 (A) shows the triangle or sawtooth wave at the input lead 16 to the operational amplifier. At this point the triangle wave can be seen to have a DC component which is supplied by the positive reference voltage V +. The value of the reference voltage V + is selected so that the DC voltage level at input lead 16 to the operational amplifier is equal to half the peak to peak voltage of the triangle wave at the same input lead. Addition of the DC voltage to the triangle wave operates to shift the wave in a positive direction so that the lowest voltage level of the triangle coincides with zero ground voltage.

A positive X analog voltage which may represent gas turbine engine inlet temperature is applied at the other input lead 12 to the operational amplifier through resistor 10. The value of the X voltage may be any DC potential which does not cause the voltage level at the input lead 12 to exceed the peak value of the triangle waveform at the input lead 16. The X voltage at input lead 12 is shown in FIG. 2 (A) superimposed on the triangle waveform at input lead 16. The operational amplifier compares the two input signals in a manner that results in a constant positive voltage at the output lead 24 for the time period that the voltage potential of the triangle wave input exceeds the X input and results in a constant negative voltage at the output lead 24 for the time period that the voltage potential of the X input exceeds the triangle input. FIG. 2 (B) shows the square wave output at lead 24 with the vertical phantom lines referencing the points of intersection where the two input voltages are of equal potential. As now becomes obvious, the pulse width of negative cycles of the output square wave are directly proportional to the level of the X input voltage, thereby displaying pulse width modulation of the X input signal. The need for a fast switching operational amplifier is also made obvious due to the desirability of having the output approach a perfect square wave which can be made possible only by an amplifier having instantaneous switching capability.

Positive cycles of the square wave are eliminated by the negative selector. The base voltage of transistor 26 is clamped to ground by means of diode 32 which insures that the base voltage never exceeds the anode to cathode voltage drops across the diode junction. The voltage drop across the base emitter junction of transistor 26 is matched to the voltage drop across diode 32 so that the voltage potential at the emitter of transistor 26 can never exceed the zero volt ground reference.

Negative cycles of the square wave at lead 24 forward bias diode 34, and subsequently negatively bias the base of transistor 26 so as to limit the base and emitter current of the transistor. Transistor 26 is preferably selected to have an overall gain of one so that negative cycles of the square wave input are transmitted without amplification to the output lead 36 of the negative selector while positive cycles are chopped resulting in a negative pulse train as shown in FIG. 2 (C). Temperature compensation is provided by selecting two matched transistors having identical thermal coefficients and utilizing one of the transistors at 26 and the base emitter junction of the other transistor for diode 32.

Pulse height modulation of the negative pulse train from lead 36 is provided by the positive selector. Zero volt cycles of the negative pulse train effect a forward bias of diode 46 so as to clamp the base voltage of transistor 38 at a level below ground equal to the anode to cathode voltage drop across the diode junction. The voltage drop across the emitter base junction of transistor 36 is equivalent to the voltage drop across the diode 46, hence the voltage at output lead 48 becomes clamped to zero volts for zero volt cycles of the input pulse train. The negative Y analog input voltage may represent nozzle area in a gas turbine engine and is limited to a range of values which is less than the magnitude of the negative pulse train so that for negative cycles of the pulse train, diode 46 is reverse biased and diode 44 is forward biased. During negative cycles of the pulse train, the magnitude of the Y input voltage controls the base current to transistor 38 and hence the emitter voltage at lead 48 thereby ultimately controlling the amplitude of the output signal shown by the amplitude modulated pulse train of FIG. 2 (D). Transistor 38 preferably is selected to have a gain of one so that the magnitude of the negative cycles of the pulse train at output 14 corresponds directly to the magnitude of the Y input voltage. As can be readily seen, the width and height of the output pulse train are modulated as a function of X and Y respectively. Temperature compensation is again provided for the positive selector by choosing two matched transistors having identical thermal coefficients and utilizing one of the transistors at 38 and the base emitter junction of the other transistor for diode 46.

The integrator circuit integrates the area enveloped by the negative pulse train of FIG. 2 (D) so as to provide a DC analog output voltage, the value of which is equivalent to the result of multiplying the voltage level of the X input by the voltage level of the Y input.

Referring now to FIG. 3 in conjunction with FIG. 4 there is shown a circuit wherein a negative X input analog voltage may be multiplied by a positive Y input analog voltage. FIG. 4 (A) shows the triangle wave as viewed from the input lead 16' to the operational amplifier. A negative DC voltage from the V- supply is added to the triangle wave to shift the wave in a negative direction so that the highest voltage potential of the triangle coincides with the zero ground voltage.

The negative analog voltage −X is applied to the other input lead 12' to the operational amplifier through resistor 10' and is shown in FIG. 4 (A) superimposed on the triangle waveform. The operational amplifier compares the input signals in the previously described manner and the resultant output signal at lead 24' is a square wave as shown in FIG. 4 (B) where the pulse width of the positive cycles is directly proportional to the magnitude of the negative X input voltage.

Negative cycles of the square wave are eliminated by the positive selector. The base voltage of transistor 26' is clamped to ground by means of diode 32' so that the voltage at the emitter of transistor 26' will not decrease below the zero volt ground reference. Positive cycles of the square wave from lead 24' forward bias diode 34' and turn transistor 26' off, resulting in a positive pulse train at the output lead 36' of the positive selector as shown in FIG. 4 (C).

Pulse height modulation of the positive pulse train from lead 36' is provided by the negative selector. Zero volt cycles of the positive pulse train cause a forward bias of diode 46' so as to clamp the base and emitter voltages of transistor 38' to the zero volt ground reference. The positive Y analog input voltage must be limited not to exceed the magnitude of the positive pulse train so that for positive cycles of the pulse train, diode 46' is reverse biased and diode 44' is forward biased. During positive cycles of the pulse train, the magnitude of the Y input voltage controls the base current of transistor 38' and the emitter voltage at output lead 48'. The resultant output signal is shown by the amplitude modulated pulse train of FIG. 4 (D) wherein the width and height of the output pulse train are modulated as a function of X and Y respectively.

The integrator circuit integrates the area enveloped by the positive pulse train of FIG. 4 (D) so as to provide a DC analog output voltage, the value of which is equivalent to the result of multiplying the voltage level of the X input by the voltage level of the Y input.

Having thus described alternate embodiments of the invention, what is desired to be secured by letters patent is as follows:

1. A circuit for modulating pulse width as a function of a first input voltage and pulse height as a function of a second input voltage of opposite polarity comprises:
A. an operational amplifier for receiving two input signals and comparing the voltage magnitudes of the input signals in a manner that produces either a positive output voltage signal or a negative output voltage signal depending upon which input voltage magnitude exceeds the other so as to display a square wave output signal;
B. means for biasing the operational amplifier;
C. means for applying the first input voltage to one input lead of the operational amplifier;
D. means for applying a triangle voltage signal to the other input lead of the operational amplifier;
E. first selector means for passing only that polarity of the amplifier output square wave where increased pulse width of the signal is a direct consequence of increased first input voltage magnitude;
F. second selector means for modulating the magnitude of the signal pulses passed by the first selector means of a function of the magnitude of the second input voltage, and
G. means for providing external bias voltage to the first and second selector means.

2. The circuit of claim 1 wherein:
the first input voltage is of a positive polarity,
the triangle voltage signal includes a positive DC component equal to half the peak to peak value of the triangle signal,
the output of the amplifier approximates a square wave with the width of negative pulses modulated as a function of the first input voltage amplitude,
the first selector means is adapted to pass only negative extending pulses from the amplifier, and the second input voltage is of a negative polarity for modulating the magnitude of the negatively extending pulses.

3. The circuit of claim 2 wherein the first selector means includes:
an NPN transistor;
a first diode having a grounded cathode and an anode connecting directly to the base of the transistor so as to clamp the emitter voltage of the transistor preventing voltage excursions above zero ground voltage;
a second diode wherein the cathode connects directly to receive the output signal from the amplifier and the anode connects directly to the base of the transistor;
a resistive element interconnecting the base collector junction of the transistor; and
means for applying a positive bias voltage to the collector and a negative bias voltage to the emitter.

4. The circuit of claim 2 wherein the second selector means includes:
a PNP transistor;
a first diode having an anode connecting directly to the output of the first selector means and a cathode connecting directly to the base of the transistor;
a second diode having an anode connecting directly to the second input voltage and a cathode connecting directly to the base of the transistor; and
means for applying a negative bias voltage to the collector of the transistor and a positive bias voltage to the emitter of the transistor.

5. The circuit of claim 1 wherein:
the first input voltage is of negative polarity;
the triangle voltage signal includes a negative DC component equal to half the peak to peak value of the triangle signal;
the output of the amplifier approximates a square wave with the width of positive pulses modulated as a function of the first input voltage magnitude;

the first selector means is adapted to pass only positive extending pulses from the amplifier, and
the second input voltage is of a positive polarity for modulating the amplitude of the positively extending pulses.

6. The circuit of claim 5 wherein the first selector means includes:
a PNP transistor;
a first diode having a grounded anode and a cathode connecting directly to the base of the transistor so as to clamp the emitter voltage of the transistor preventing voltage excursions below the zero ground voltage;
a second diode wherein the anode connects directly to receive the output signal from the amplifier and the cathode connects directly to the base of the transistor;
a resistive element interconnecting the base collector junction of the transistor; and
means for applying a positive bias voltage to the emitter and a negative bias voltage to the collector.

7. The circuit of claim 5 wherein the second selector means includes:
an NPN transistor;
a first diode having a cathode connecting directly to the output of the first selector means and an anode connecting directly to the base of the transistor;
a second diode having a cathode connecting directly to the second input voltage and an anode connecting directly to the base of the transistor; and
means for applying a negative bias voltage to the emitter of the transistor and a positive bias voltage to the collector of the transistor.

8. The circuit of claim 1 wherein an integrator circuit is included to integrate the area enveloped by the output signal from the second selector thereby producing a voltage output indicative of the multiplication of the first input voltage by the second input voltage.

* * * * *